US012359763B2

(12) United States Patent
Chung

(10) Patent No.: US 12,359,763 B2
(45) Date of Patent: Jul. 15, 2025

(54) STRAINER HAVING NON-POWERED CLEANING FUNCTION

(71) Applicant: FIRE CONTROLS INTERNATIONAL CO., LTD., Gwangju-si (KR)

(72) Inventor: Do Jun Chung, Seoul (KR)

(73) Assignee: FIRE CONTROLS INTERNATIONAL CO., LTD., Gwangju-si (KR)

( * ) Notice: Subject to any disclaimer, the term of this patent is extended or adjusted under 35 U.S.C. 154(b) by 0 days.

(21) Appl. No.: 18/685,435

(22) PCT Filed: Aug. 9, 2022

(86) PCT No.: PCT/KR2022/011851
§ 371 (c)(1),
(2) Date: Feb. 21, 2024

(87) PCT Pub. No.: WO2023/027385
PCT Pub. Date: Mar. 2, 2023

(65) Prior Publication Data
US 2024/0353047 A1    Oct. 24, 2024

(30) Foreign Application Priority Data

Aug. 24, 2021 (KR) .................... 10-2021-0111480

(51) Int. Cl.
*F16L 55/24* (2006.01)
*B01D 35/16* (2006.01)
*B01D 35/28* (2006.01)

(52) U.S. Cl.
CPC .............. *F16L 55/24* (2013.01); *B01D 35/16* (2013.01); *B01D 35/28* (2013.01)

(58) Field of Classification Search
None
See application file for complete search history.

(56) References Cited

U.S. PATENT DOCUMENTS

| 5,404 A | * | 12/1847 | Watson | ................ | B01D 29/118 |
| | | | | | 210/415 |
| 337,423 A | * | 3/1886 | Moore | ................... | B01D 24/10 |
| | | | | | 210/411 |

(Continued)

FOREIGN PATENT DOCUMENTS

| JP | 7-108116 A | 4/1995 |
| JP | 7-136420 A | 5/1995 |

(Continued)

OTHER PUBLICATIONS

International Search Report for PCT/KR2022/011851 by Korean Intellectual Property Office dated Nov. 7, 2022.

*Primary Examiner* — Robert J Popovics
(74) *Attorney, Agent, or Firm* — BROADVIEW IP LAW, PC

(57) ABSTRACT

Disclosed is a strainer having a non-powered cleaning function. The present invention enables filtration of foreign substances from fluid by disposing a cylindrical filter mesh inside a main body of the trainer, such that the fluid from an inlet pipe flows through the filter mesh toward an outlet pipe. The present invention also enables cleaning of the filter mesh by disposing a central shaft of a scraper at the center of the filter mesh, and rotating the central shaft such that brushes connected thereto scrape off foreign substances collected on the filter mesh.

9 Claims, 5 Drawing Sheets

(56) References Cited

U.S. PATENT DOCUMENTS

| | | | | |
|---|---|---|---|---|
| 422,112 A * | 2/1890 | Berkefeld | B01D 29/05 | 210/429 |
| 431,448 A * | 7/1890 | Dixon | B01D 29/33 | 210/512.1 |
| 437,433 A * | 9/1890 | Hegner et al. | B01D 36/001 | 210/120 |
| 492,501 A * | 2/1893 | Mozingo | B01D 36/001 | 210/120 |
| 554,312 A * | 2/1896 | Robinson | B01D 24/007 | 210/415 |
| 555,020 A * | 2/1896 | Railton et al. | B01D 33/23 | 210/313 |
| 565,089 A * | 8/1896 | Prince | B02C 13/26 | 210/415 |
| 724,944 A * | 4/1903 | Roberts | B01D 29/33 | 210/408 |
| 748,251 A * | 12/1903 | Allen | B01D 29/33 | 415/121.2 |
| 773,220 A * | 10/1904 | Patterson | B03B 9/061 | 68/1 |
| 781,039 A * | 1/1905 | Weabe | B01D 29/05 | 210/414 |
| 788,922 A * | 5/1905 | Mackenzie | B01D 29/05 | 210/414 |
| 811,664 A * | 2/1906 | Rood | B01D 29/33 | 210/397 |
| 950,118 A * | 2/1910 | Rood | B01D 29/118 | 210/415 |
| 969,364 A * | 9/1910 | Grootenhuis | B01D 33/06 | 210/354 |
| 989,975 A * | 4/1911 | Holt | B01D 35/02 | 210/415 |
| 1,046,679 A * | 12/1912 | Thoma | B01D 29/56 | 210/418 |
| 1,098,150 A * | 5/1914 | Hauer | B01D 33/073 | 210/330 |
| 1,102,791 A * | 7/1914 | Overly | B01D 35/02 | 210/314 |
| 1,130,725 A * | 3/1915 | Getts | B01D 33/067 | 55/296 |
| 1,140,459 A * | 5/1915 | Holt | B01D 17/00 | 210/429 |
| 1,199,350 A * | 9/1916 | Collin | B01D 29/05 | 210/414 |
| 1,438,983 A * | 12/1922 | Collin | B01D 27/00 | 137/625.5 |
| 1,443,918 A * | 1/1923 | King | B01D 25/38 | 210/415 |
| 1,510,863 A * | 10/1924 | Rose | B01D 29/6415 | 210/414 |
| 1,671,487 A * | 5/1928 | Quiroz | B01D 29/682 | 210/194 |
| 1,679,033 A * | 7/1928 | Holmes | B01D 35/02 | 210/312 |
| 1,741,444 A * | 12/1929 | Slider | B01D 29/6415 | 210/355 |
| 1,803,477 A * | 5/1931 | Kullander | B01D 29/6484 | 210/414 |
| 1,903,774 A * | 4/1933 | Burrell | B01D 33/503 | 210/402 |
| 1,987,142 A * | 1/1935 | Clements, Jr. | B01D 29/6484 | 210/414 |
| 1,993,214 A * | 3/1935 | Hass | B01D 29/82 | 210/489 |
| 2,125,532 A * | 8/1938 | Wells | B01D 29/118 | 210/414 |
| 2,275,958 A * | 3/1942 | Hagel | B01D 35/16 | 210/414 |
| 2,305,351 A * | 12/1942 | Hellan | B01D 35/00 | 210/313 |
| 2,372,445 A * | 3/1945 | Morgan | B01D 35/02 | 210/453 |
| 2,594,785 A * | 4/1952 | Meeker | B02C 18/0092 | 210/415 |
| 2,606,663 A * | 8/1952 | Blackman | F16L 55/24 | 210/451 |
| 2,652,153 A * | 9/1953 | Perrault | F16L 55/24 | 210/355 |
| 2,678,732 A * | 5/1954 | Banks | B01D 29/6476 | 210/414 |
| 3,249,227 A * | 5/1966 | Long | E21B 21/063 | 210/512.1 |
| 3,379,312 A * | 4/1968 | Brown | B01D 35/147 | 210/457 |
| 3,622,006 A * | 11/1971 | Brunner | B01D 35/14 | 210/448 |
| 3,695,173 A * | 10/1972 | Cox | B30B 9/12 | 210/414 |
| 3,850,802 A * | 11/1974 | Berger | B01D 29/6423 | 210/447 |
| 3,959,140 A * | 5/1976 | Legras | B01D 29/94 | 210/489 |
| 5,080,788 A * | 1/1992 | Chen | B01D 29/90 | 210/441 |
| 5,198,111 A * | 3/1993 | Davis | B01D 29/6484 | 210/414 |
| 5,527,462 A * | 6/1996 | Davis | B01D 29/6484 | 210/414 |
| 5,587,074 A * | 12/1996 | Lynch | B01D 29/23 | 210/411 |
| 5,632,903 A * | 5/1997 | Caracciolo, Jr. | B01D 29/117 | 210/411 |
| 5,714,065 A * | 2/1998 | Huder | B01D 29/6415 | 55/296 |
| 6,017,300 A * | 1/2000 | Herman | B04B 9/06 | 210/167.02 |
| 6,213,929 B1 * | 4/2001 | May | B04B 9/06 | 494/24 |
| 6,258,594 B1 * | 7/2001 | Nakaya | A47K 11/00 | 210/414 |
| 6,602,180 B2 * | 8/2003 | Herman | B04B 7/12 | 184/6.24 |
| 6,709,477 B1 * | 3/2004 | Håkansson | B04B 5/08 | 123/573 |
| 7,297,265 B1 * | 11/2007 | Booth | B01D 29/688 | 210/411 |
| 7,338,546 B2 * | 3/2008 | Eliasson | B04B 5/005 | 55/423 |
| 7,445,653 B2 * | 11/2008 | Trautmann | B04B 5/12 | 55/437 |
| 8,524,075 B1 * | 9/2013 | Quintel | B01D 29/688 | 210/791 |
| 8,727,248 B2 * | 5/2014 | Galanty | F04D 7/045 | 241/46.06 |
| 8,752,480 B1 * | 6/2014 | DeJong | A23L 2/04 | 99/506 |
| 8,794,222 B2 * | 8/2014 | Schwandt | F01M 13/022 | 123/573 |
| 8,974,567 B2 * | 3/2015 | Verdegan | F01M 13/04 | 55/400 |
| 9,211,489 B2 * | 12/2015 | Riggers | B08B 5/04 | |
| 9,616,363 B2 * | 4/2017 | Osman Oguz | B01D 29/94 | |
| 9,816,282 B2 * | 11/2017 | Chick | E04H 4/1245 | |
| 10,245,531 B2 * | 4/2019 | Steiner | B01D 29/688 | |
| 10,646,801 B2 * | 5/2020 | Tameroglu | B01D 29/6415 | |
| 10,828,583 B2 * | 11/2020 | Takahashi | B01D 29/11 | |
| 11,083,985 B2 * | 8/2021 | Nellis | B01D 46/00 | |
| 11,103,812 B2 * | 8/2021 | Canaia | B29C 48/2545 | |
| 11,278,826 B2 * | 3/2022 | Deutschmeyer | B01D 29/688 | |
| 11,446,598 B2 * | 9/2022 | Holm | B01D 46/0031 | |
| 11,458,484 B2 * | 10/2022 | Herman | B04B 5/005 | |
| 11,484,818 B2 * | 11/2022 | De Los Reyes, III | B01D 29/114 | |
| 11,691,100 B2 * | 7/2023 | Takahashi | B01D 46/2403 | 55/296 |
| 11,872,507 B2 * | 1/2024 | Jellinggaard | B01D 29/682 | |
| 11,951,431 B2 * | 4/2024 | Holm | B01D 46/0001 | |
| 11,969,675 B2 * | 4/2024 | Okuno | B01D 29/902 | |

(56) References Cited

U.S. PATENT DOCUMENTS

| | | | |
|---|---|---|---|
| 12,030,063 B2* | 7/2024 | Herman | B04B 9/06 |
| 12,083,526 B1* | 9/2024 | Nassef | B01F 27/90 |
| 12,208,348 B2* | 1/2025 | Vestman | B01D 29/35 |
| 2002/0008068 A1* | 1/2002 | Anderson | B01D 29/684 |
| | | | 210/741 |
| 2009/0321333 A1* | 12/2009 | Magliocca | A47J 37/1223 |
| | | | 210/167.28 |
| 2011/0180051 A1* | 7/2011 | Schwandt | F01M 13/023 |
| | | | 123/573 |
| 2011/0309039 A1* | 12/2011 | DeWaard | B30B 9/12 |
| | | | 210/791 |
| 2013/0087495 A1* | 4/2013 | Riggers | B01D 46/04 |
| | | | 210/415 |
| 2014/0124432 A1* | 5/2014 | Yoon | B01D 29/114 |
| | | | 210/355 |
| 2016/0030875 A1* | 2/2016 | Parikh | B01D 46/0056 |
| | | | 55/400 |
| 2016/0214039 A1* | 7/2016 | Tameroglu | B01D 29/6446 |
| 2017/0014736 A1* | 1/2017 | Osman Oguz | B01D 29/23 |
| 2018/0093211 A1* | 4/2018 | Takahashi | B01D 46/24 |
| 2018/0207557 A1* | 7/2018 | Nellis | D21C 11/06 |
| 2019/0160402 A1 | 5/2019 | Chen | |
| 2020/0171420 A1* | 6/2020 | Holm | B01D 46/0047 |
| 2020/0254463 A1* | 8/2020 | Goertz | B01D 29/073 |
| 2021/0023482 A1* | 1/2021 | Eisen | B01D 29/23 |
| 2021/0023483 A1* | 1/2021 | Takahashi | C02F 1/001 |
| 2022/0001310 A1* | 1/2022 | Jellinggaard | B01D 29/682 |
| 2022/0047973 A1* | 2/2022 | Eisen | B01D 29/6453 |
| 2022/0143535 A1* | 5/2022 | Mercado Alvarado | |
| | | | B01D 29/6415 |
| 2022/0184535 A1* | 6/2022 | Okuno | B01D 35/02 |
| 2022/0339562 A1* | 10/2022 | Vestman | C02F 1/001 |
| 2022/0387920 A1* | 12/2022 | Holm | B01D 46/003 |
| 2023/0405500 A1* | 12/2023 | Mueller | B01D 36/04 |
| 2024/0269592 A1* | 8/2024 | Holm | B01D 46/0056 |
| 2024/0353047 A1* | 10/2024 | Chung | B01D 35/16 |
| 2024/0399275 A1* | 12/2024 | Okuno | B01D 29/11 |

FOREIGN PATENT DOCUMENTS

| | | |
|---|---|---|
| JP | 4114789 B2 | 7/2008 |
| KR | 20-0207850 Y1 | 12/2000 |
| KR | 20-0273295 Y1 | 5/2002 |
| KR | 10-0889960 B1 | 3/2009 |
| KR | 10-2196512 B1 | 12/2020 |
| KR | 10-2340341 B1 | 12/2021 |

* cited by examiner

STRAINER HAVING NON-POWERED CLEANING FUNCTION

CROSS-REFERENCE TO RELATED APPLICATIONS

This application is a National Phase Entry Application of PCT Application No. PCT/KR2022/011851, filed on Aug. 9, 2022, which claims priority to Korean Patent Application No. 10-2021-0111480, filed on Aug. 24, 2021, in Korean Intellectual Property Office, the entire contents of which are hereby incorporated by reference in its entirety.

TECHNICAL FIELD

The present invention relates to a strainer, and more particularly, to a strainer having a non-powered cleaning function.

BACKGROUND ART

In general, a pipe provided as a piping is used to transfer various fluids such as water, oil, a gas, and steam. Various pipe components such as pumps for forcibly transferring fluids, valves for opening and closing passages within the pipe or adjusting flow rates, meters for measuring flow rates of the fluids, and the like are installed in the pipe.

Foreign substances such as dirt contained in the fluids, rust generated inside the pipe, slugs generated when the pipes are connected to each other by welding, and the like exist in the pipes. The foreign substances not only damage the pipe components such as the pumps, the valves, the meters, and the like to shorten their lifespan, but also be accumulated on inner walls of the pipes to reduce flow rates within the pipe or, in severe cases, blocking the pipe.

For this reason, a strainer is installed in the pipe to filter the foreign substances in the pipe, which move along the fluid, and to regularly remove the filtered foreign substances so that the pipe is cleanly maintained.

The strainer is configured to discharge only fluids that are purified by filtering the foreign substances and other impurities in the fluids flowing along the pipe. In general, a replaceable filter mesh is installed inside a main body of the strainer, and if a certain amount of foreign substances are accumulated in the filter mesh, the foreign substances have to be separated from the main body and then have to be removed.

However, to check whether foreign substances have accumulated in the filter mesh, not only it is inconvenient to have to visually inspect the inside after loosening bolts/nuts to separate a cover from the main body, but also it is not easy to separate the cover that is tightly coupled to the main body from the main body, and as a result, there is a problem that increases in inconvenience of management.

DISCLOSURE OF THE INVENTION

Technical Problem

An object of the present invention for solving the above problem is to provide a strainer having a non-powered cleaning function, which is capable of easily checking whether foreign substances have accumulated inside the strainer using a pressure gauge and a slight glass and has a non-powered cleaning function that is capable of easily collecting the foreign substances accommodated in an internal filter mesh into a collection chamber to remove the foreign substances to the outside through a discharge valve.

Technical Solution

A strainer according to an embodiment of the present invention for solving the above problems includes: a cylindrical main body provided with a foreign substance collection chamber configured to collect foreign substance at one side of a lower portion thereof; an inlet pipe installed in one surface of the main body; an outlet pipe installed in the other surface of the main body to face the inlet pipe; a cylindrical filter mesh accommodated inside the main body to filter foreign substances contained in a fluid introduced into the main body through the inlet pipe; a lower cover coupled to a lower portion of the main body; a propeller accommodated inside the lower cover; a brush scraper comprising a central shaft which passes through a center of the filter mesh and of which a lower end is coupled to a center of the propeller and a brush connected to the central shaft to rotate together when the central shaft rotates to scrape off the filter mesh so as to remove the foreign substances accumulated on an inner circumferential surface of the filter mesh; a drain pipe configured to connect a side of the main body to the lower cover so that the fluid flows from the lower portion of the main body to the inside of the lower cover; and a 3-way discharge valve having one end connected to the lower cover and the other end connected to the foreign substance collection chamber and configured to discharge the fluid contained in the main body to the outside or discharge the fluid contained in the lower cover to the outside according to a discharge mode.

Also, in another embodiment of the present invention, when the 3-way discharge valve is opened in a cleaning mode, the fluid contained in the main body may be introduced into the lower cover through the drain pipe, and the fluid introduced into the lower cover may be discharged through the 3-way discharge valve to rotate the propeller, thereby rotating the central shaft.

Also, in another embodiment of the present invention, when the 3-way discharge valve is opened in a discharge mode, the fluid contained in the main body may be discharged through the 3-way valve connected to the foreign substance collection chamber.

Also, in another embodiment of the present invention, the strainer may further include a collection scraper coupled to a lower portion of the central shaft to rotate together when the central shaft rotates so that the foreign substances on a bottom surface of the main body are collected into the foreign substance collection chamber.

Also, in another embodiment of the present invention, the strainer may further include: an upper cover coupled to an opened upper portion of the main body; and a handle, wherein an upper end of the central shaft may be coupled to a center of the handle by passing through a center of the upper cover, and when the handle rotates, the central shaft may rotate by being interlocked with the handle.

Also, in another embodiment of the present invention, the strainer may further include: a first pressure gauge installed in the inlet pipe; and a second pressure gauge installed in the outlet pipe.

Also, in another embodiment of the present invention, the brush may be connected to the central shaft while rotating in a certain direction as it goes downward from an upper portion of the central shaft.

Also, in another embodiment of the present invention, a speed controller configured to adjust an amount of fluid flowing through the drain pipe to control a rotation speed of the propeller may be further provided between the drain pipe and the lower cover.

Also, in another embodiment of the present invention, each of the inlet pipe and the outlet pipe may be connected to the pipe by a groove joint.

Advantageous Effects

According to the present invention, the cylindrical filter mesh may be disposed inside the strainer body so that the fluid introduced from the inlet pipe flows to the outlet pipe through the filter mesh, thereby filtering the foreign substances in the fluid.

In addition, according to the present invention, the central shaft of the scraper may be disposed at the center of the filter mesh, and the central shaft may rotate to scrape off the foreign substances accumulated on the filter mesh using the brushes connected to the central shaft, thereby cleaning the filter mesh.

In particular, according to the present invention, the propeller may be disposed inside the lower cover coupled to the lower portion of the main body, and after the center of the propeller may be coupled to the central shaft of the brush scraper, the propeller may rotate by the flow of the fluid, which is generated when the fluid is discharged through the 3-way discharge valve connected to the lower cover, and then, the central shaft coupled thereto and the brush may rotate to remove the foreign substances accumulated on the filter mesh by using the brush, thereby cleaning the inside of the strainer without the power.

In particular, according to the present invention, after the 3-way discharge valve may be opened in the cleaning mode to separate the foreign substances from the filter mesh without the power by using the 3-way discharge valve, the 3-way valve may be opened in the discharge mode to directly discharge the foreign substances, which are disposed inside the main body, to the outside without passing through the propeller to prevent the foreign substances from sticking to the propeller, thereby simply and efficiently cleaning the inside of the strainer.

MODE FOR CARRYING OUT THE INVENTION

Hereinafter, a strainer according to a preferred embodiment of the present invention will be described with reference to the accompanying drawings.

Figure 1A:
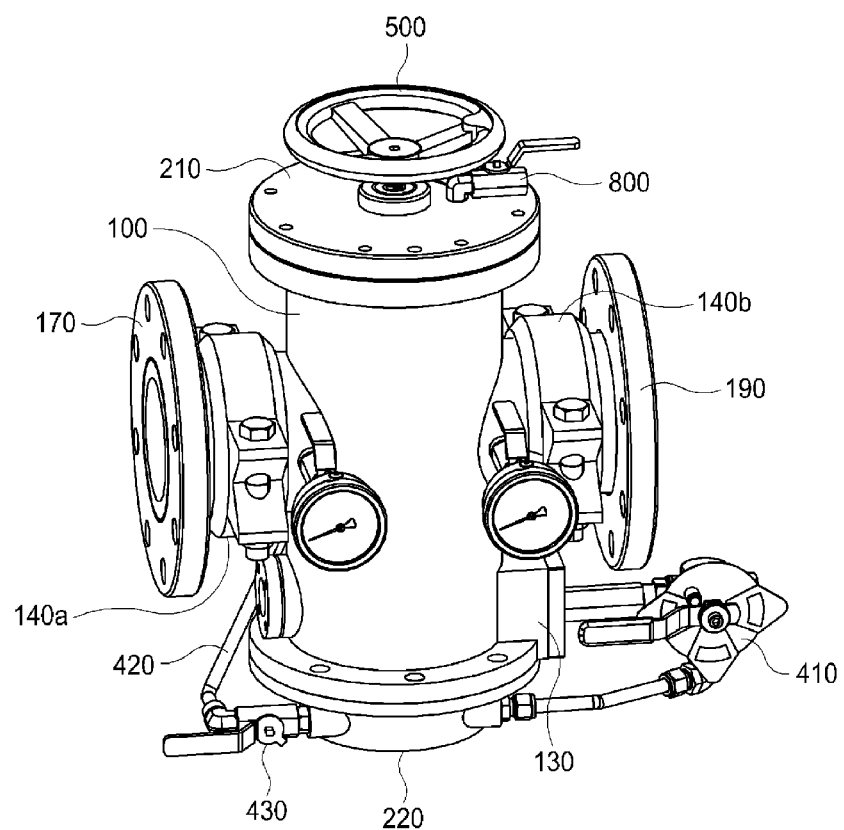
FIGS. 1A and 1B are views illustrating an outer appearance of a strainer according to a preferred embodiment of the present invention.
Figure 1B:
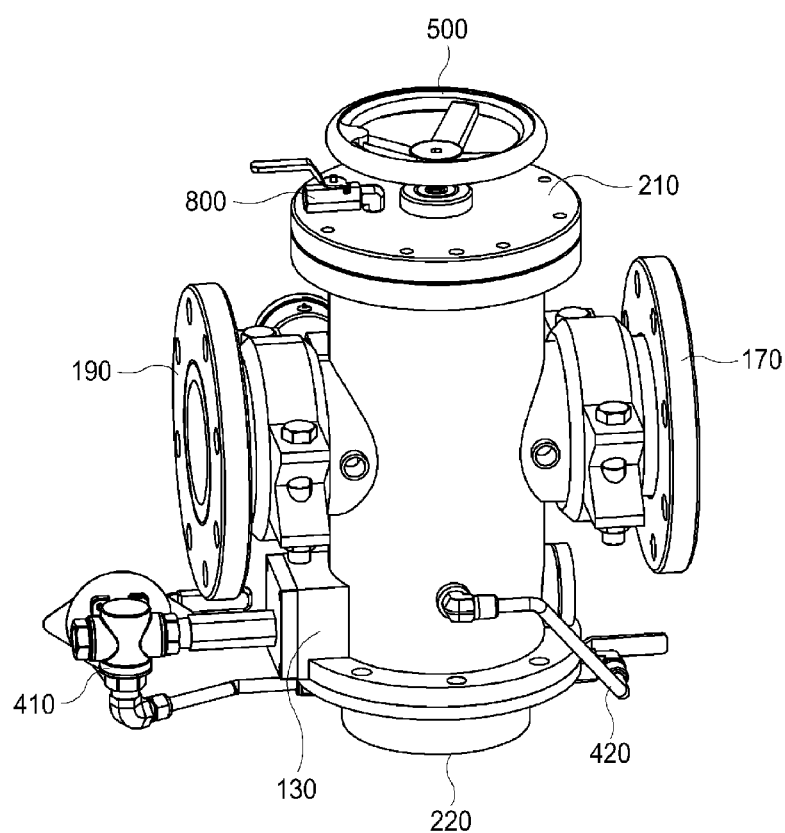
Figure 2:
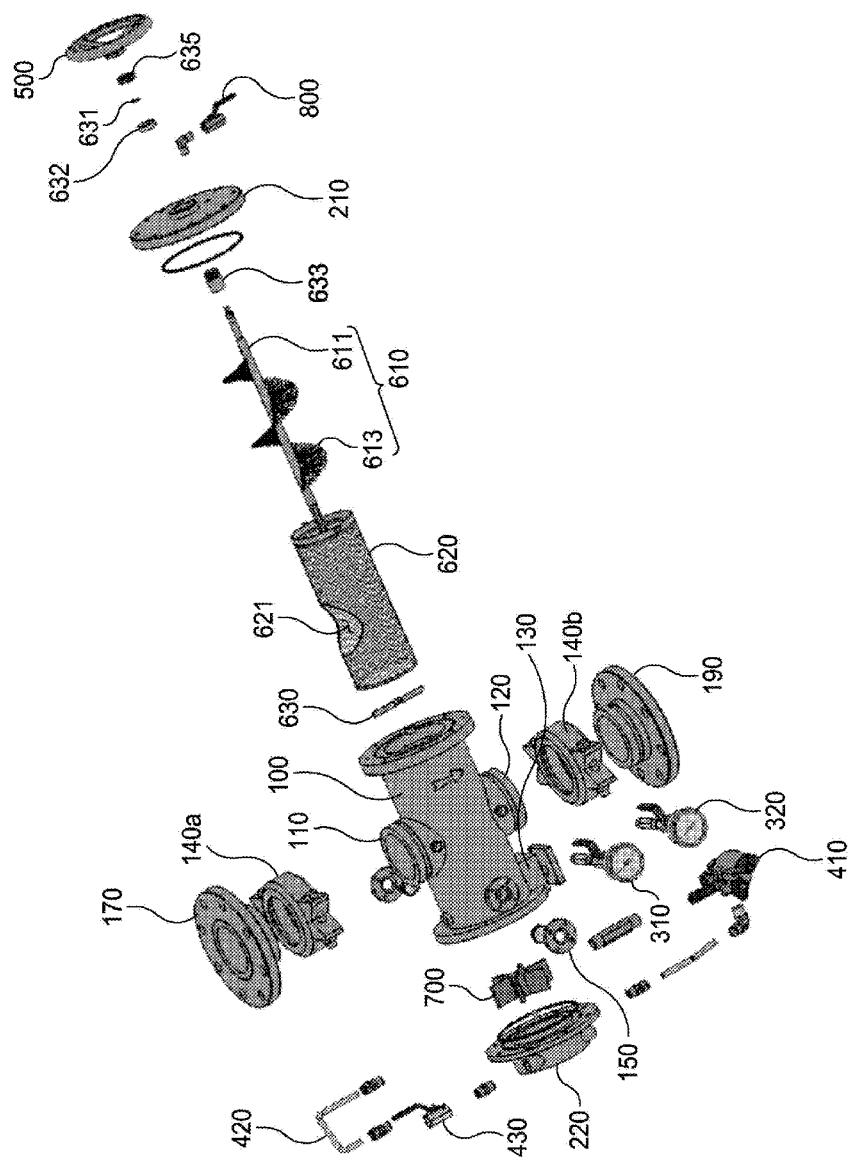
FIG. 2 is an exploded perspective view of the strainer according to a preferred embodiment of the present invention.
Figure 3:
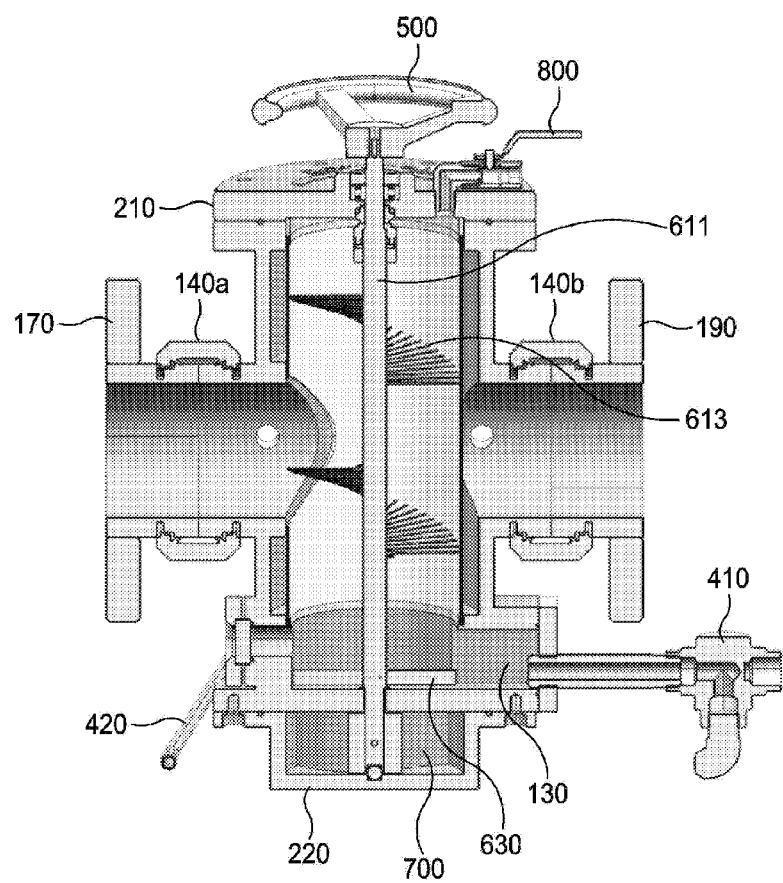
FIG. 3 is a cross-sectional view of the strainer according to a preferred embodiment of the present invention.
Figure 4:
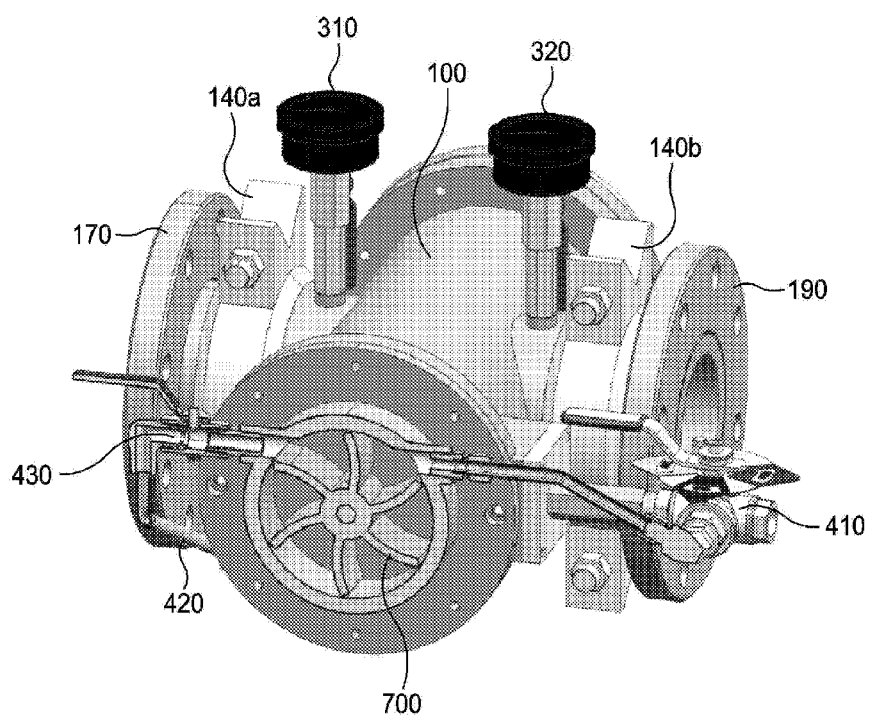
FIG. 4 is a view illustrating a lower structure of the strainer according to a preferred embodiment of the present invention.

FIGS. 1A and 1B are views illustrating an outer appearance of a strainer according to a preferred embodiment of the present invention, FIG. 2 is an exploded perspective view of the strainer according to a preferred embodiment of the present invention, FIG. 3 is a cross-sectional view of the strainer according to a preferred embodiment of the present invention, and FIG. 4 is a view illustrating a lower structure of the strainer according to a preferred embodiment of the present invention.

Referring to FIGS. 1A to 4, a strainer according to a preferred embodiment of the present invention includes a cylindrical body 100 having an opened upper portion and a closed lower portion, an inlet pipe 110 disposed in one surface of a main body 100, an outlet pipe 120 disposed in the other surface of the main body 100, a cylindrical filter mesh 620 accommodated inside the main body 100, having a hollow defined therein, and having opened upper and lower portions, an upper cover 210 coupled to the upper portion of the main body 100, a lower cover 220 coupled to the lower portion of the main body 100, a brush scraper 610 of which a central shaft 611 is disposed along the hollow center of the filter mesh 620, a collection scraper 630 coupled to the central shaft of the brush scraper 610 to rotate together with the brush scraper 610 so that foreign substance on a bottom surface of the main body are collected into a foreign substance collection chamber, a propeller 700 accommodated inside the lower cover 220 and coupled to a lower end of the central shaft 611 of the scraper 610, and a handle 500 coupled to an upper end of the central shaft 611 of the brush scraper 610.

An air discharge valve 800 for discharging air inside the main body 100 after cleaning is completed in a cleaning mode is installed on the upper cover 210.

The main body 100 has a cylindrical shape having a closed lower portion and an opened upper portion, and the upper portion is coupled to the upper cover 210. The inside of the main body 100 is empty to accommodate the filter mesh 620, a drain hole 150 is formed in a lower edge of the main body 100, and a drain pipe 420 connecting the drain hole 150 to the lower cover 220 is coupled to the drain hole 150.

When the 3-way valve set to the cleaning mode is opened, a fluid inside the main body 100 is introduced into the lower cover 220 through the drain hole 150 and the drain pipe 420, and the fluid introduced into the lower cover is discharged through the 3-way valve while rotating the propeller 700.

Here, in order to prevent damage to the brush scraper 610 and the filter mesh 620 due to an excessive speed of the propeller, a speed controller 430 for adjusting an amount and speed of fluid introduced from the main body 100 to the lower cover 220 is installed between the drain pipe 420 and the lower cover 220. The speed controller 430 may be implemented in the form of a valve, and a manager may adjust an opening/closing amount of speed controller 430 to adjust a rotation speed of the propeller 700 and a rotation speed of the brush scraper 610.

The inlet pipe 110 is disposed in one surface of the main body 100, and the inlet pipe 110 is coupled to an inlet flange 170 through a groove joint 140a. A conduit of the inlet pipe 110 communicates with the inside of the main body 100. The inlet pipe 110 is connected to the pipe by the inlet flange 170. Thus, the fluid such as water moving along the pipe is introduced into the main body 100 through the inlet pipe 110.

The outlet pipe 120 is disposed in the other surface of the main body 100 to face the inlet pipe 110. The outlet pipe 120 is connected to a position facing the inlet pipe 110. A conduit of the outlet pipe 120 communicates with the inside of the main body 100. The outlet pipe 120 is connected to an outlet flange 190 by a groove joint 140b and is connected to a pipe through which the fluid moves by the outlet flange 190.

Thus, the fluid that introduced into the main body 100 through the inlet pipe 110 is discharged through the outlet pipe 120.

Here, flexible groove joints may be applied as the groove joints 140a and 140b, and thus, when an earthquake occurs, the groove joints 140a and 140b may flexibly move to perform an earthquake-resistant role.

The filter mesh 620 is accommodated inside the main body 100. The filter mesh 620 serves to filter the foreign substances contained in the fluid introduced into the main body 100 through the inlet pipe 110.

The filter mesh 620 is provided in a cylindrical shape having a hollow therein, and upper and lower portions of the filter mesh 620 are opened. Here, the upper portion is in contact with the upper cover 210. The lower portion is in contact with the bottom surface of the main body 100 or is fixed to be in contact with the bottom surface of the main body 100 through a pair of supports connected to the lower portion.

A cylindrical circumference of the filter mesh 620 is configured in a mesh pattern and serves to allow the fluid to pass therethrough and filter the foreign substances contained in the fluid to prevent it from passing therethrough. A connection hole 621 is formed in one side of the filter mesh 620 connected to the pipe of the inlet pipe 110, and thus, the fluid introduced through the inlet pipe 110 is not caught on a mesh of the filter mesh 620 but is introduced into the main body 100. Then, the fluid introduced into the main body 100 passes through the mesh to flow into the outlet pipe 120, and the foreign substances contained in the fluid are caught on the mesh of the filter mesh 620 so as not to be discharged to the outlet pipe 120 and thus be accumulated on an inner surface of the filter mesh 620.

The brush scraper 610 is constituted by a central shaft 611 that passes through the hollow of the filter mesh 620 to extend along the hollow of the filter mesh 620 and a brush 613 connected to the central shaft 611. The brush 613 is connected to the central shaft 611 in a vortex shape along the central shaft 611 as illustrated in the drawings. That is, the brush 613 is connected to the central shaft 611 while rotating in a clockwise direction as it goes downward from the upper portion of the central shaft 611.

An upper end of the central shaft 611 of the brush scraper 610 passes through a hole formed in a center of the upper cover 210 and is connected to the handle 500, a mechanical seal 633 is interposed between the upper cover 210 and the central shaft 611 to block the discharge of the fluid to the outside, and a bearing 632, a snap ring 631, and an oil seal 635 are interposed between the upper cover 210 and the handle 500 to reduce friction. Thus, when the manager rotates the handle 500 at the outside, the brush scraper 610 rotates in a direction in which the handle 500 rotates.

The lower end of the central shaft 611 of the brush scraper 610 passes through a hole defined in the center of the bottom surface of the main body 100 and is coupled to the center of the propeller 700 accommodated inside the lower cover 220. Thus, when the propeller 700 rotates, the central shaft 611 of the brush scraper 610 also rotates by being interlocked with the rotation of the propeller 700.

A first pressure gauge 310 that measures a pressure within the inlet pipe 110 is installed in the inlet pipe 110, a second pressure gauge 320 that measures a pressure within the outlet pipe 120 is installed in the outlet pipe 120. Thus, the manager may check the pressure of the inlet pipe 110 through the first pressure gauge 310 and the pressure of the outlet pipe 120 through the second pressure gauge 320. In a preferred embodiment of the present invention, when the foreign substances are accumulated on the filter mesh 620, a flow of the fluid from the inlet pipe 110 to the outlet pipe 120 is obstructed, and thus, the pressure of the outlet pipe 120 is reduced. Thus, an amount of foreign substances accumulated on the filter mesh 620 may be determined from a difference between the pressure value measured by the first pressure gauge 310 and the pressure value measured by the second pressure gauge 320.

In addition, a check window 150 may be installed on one surface of the main body 100 to check an internal state of the main body. The check window is preferably installed at a lower portion of the main body, and the manager may check whether the foreign substances have accumulated on the bottom surface of the main body 100 through a glass installed on the check window.

The foreign substance collection chamber that extends in a direction of the outlet pipe 120 is provided in the bottom surface of the main body 100, and one end of the 3-way discharge valve is connected to a side surface of the foreign substance collection chamber.

A collection scraper 630 is coupled to a lower portion of the central shaft 611 of the brush scraper 610, and as the brush scraper 610 rotates, the collection scraper 630 also rotates. Here, the foreign substances separated from the filter mesh 620 by the brush scraper 610 fall to the bottom surface, and the foreign substances falling to the bottom surface are collected in the foreign substance collection chamber 130 by the rotating collection scraper 630. In a preferred embodiment of the present invention, the collection scraper 630 has a straight shape, but is not limited to a specific shape as long as the collection scraper 630 collects the foreign substances into the foreign substance collection chamber 130.

Thereafter, when the 3-way discharge valve 410 is opened in the discharge mode, the foreign substances collected in the foreign substance collection chamber 130 are discharged to the outside through the 3-way discharge valve.

One side of the lower cover 220 is connected to one end of the 3-way discharge valve 410, and when the manager opens the 3-way discharge valve 410 in the cleaning mode, the fluid contained in the lower cover 220 is discharged to the outside through the 3-way discharge valve 410.

As described above, the lower portion of the main body 100 and the lower cover 220 are connected to each other through the drain pipe 420, and the fluid contained in the main body 100 passes through the drain pipe 420 to the lower cover 220. In a normal mode in which the 3-way discharge valve 410 is closed, and the discharge mode in which the fluid contained in the main body 100 is discharged through the foreign substance collection chamber, the fluid contained in the lower cover 220 stays in the lower cover 220.

However, when the 3-way discharge valve 410 is opened in the cleaning mode, the fluid contained in the lower cover 220 is discharged through the 3-way discharge valve 410, and thus, the fluids within the main body 100 are introduced into the lower cover 220 through the drain pipe 420 and then are discharged through the 3-way discharge valve 410.

The propeller 700 is accommodated inside the lower cover 220 and is coupled to the lower end of the central shaft 611 of the brush scraper 610. As described above, when the manager opens the 3-way discharge valve 410 in the cleaning mode, a flow in which the fluid introduced from the main body 100 to the lower cover 220 through the drain pipe 420 is discharged through the 3-way discharge valve 410 occurs, and the flowing fluid applies a pressure to blades of the propeller 700 to allow the propeller 700 to rotate. When the propeller 700 rotates, the central shaft 611 of the brush scraper 610 coupled thereto also rotates, and the brush 613 and the collection scraper 630 connected to the central shaft 611 also rotate accordingly.

The brush 613 rotates to be in contact with an inner circumferential surface of the filter mesh 620. In this process, the foreign substances accumulated on the inner circumferential surface of the filter mesh 620 scrape off, and the foreign substances separated from the filter mesh 620 fall down on the bottom surface of the main body 100, and then, the foreign substances fallen to the bottom surface are collected by the rotating collection scraper 630 into the foreign substance collection chamber 130.

Here, if it is determined that rotation speeds of the propeller 700 and the brush scraper 610 is too fast, the manager has to adjust the speed of the propeller 700 by adjusting the amount of fluid flowing into the lower cover using the speed controller 430. This may prevent the brush scraper and the brush from being deformed due to excessive rotation of the central shaft.

As described above, the handle 500 is coupled to an upper end of the central shaft 611 of the brush scraper 610, and the manager may manually remove the foreign substances from the filter mesh 620 by turning the handle 500. That is, when the manager turns the handle 500, the central shaft 611 of the brush scraper 610 coupled to the handle 500 rotates together, and thus, the brush 613 rotates accordingly to remove the foreign substances accumulated on the filter mesh 620.

So far, the detailed configuration of the strainer according to the preferred embodiment of the present invention has been described. Hereinafter, with reference to the drawings, an operation of the strainer according to a preferred embodiment of the present invention will be described.

When pipes are connected to the inlet pipe 110 and the outlet pipe 120 of the strainer of the present invention, and the fluid is introduced into the main body 100 through the inlet pipe 110, the fluid is introduced into the filter mesh 620 through the connection hole 621 as it is and then passes through the opposite filter mesh 620 to flow to the opposite pipe through the outlet pipe 120. During this process, the foreign substances contained in the fluid are accumulated at a portion of the filter mesh 620 that is in contact with the outlet pipe 120. Here, the 3-way discharge valve 410 is set to the normal mode, and thus, the fluid is not discharged through the 3-way discharge valve 410.

When the fluid continuously flows, and the foreign substance are accumulated on the filter mesh 620, a difference between the pressure values measured by the first pressure gauge 310 and the second pressure gauge 320 may occur, and the manager can assess the amounts of foreign substances accumulated on the filter mesh 620 based on the difference in pressure values. In a general case, when the foreign substances are accumulated on the filter mesh 620, the pressure measured in the outlet pipe 120 is lower than the pressure measured in the inlet pipe 110, and when the pressure is measured in reverse, it is necessary to check whether the first pressure gauge 310 and the second pressure gauge 320 is broken down.

If the manager determines that removal of the foreign substances accumulated on the filter mesh 620 is necessary, the 3-way discharge valve 410 is set to the cleaning mode and then is opened. Then, the fluid contained in the lower cover 220 is discharged to the outside through the 3-way discharge valve 410, and the fluid within the main body 100 is introduced into the lower cover 220 through the drain pipe 420 and then is discharged again to the outside through the 3-way discharge valve 410. In this process, the fluid introduced through the drain pipe 420 and then flowing to the 3-way discharge valve 410 rotates the propeller 700, and as the propeller 700 rotates, the central shaft 611 of the brush scraper 610 coupled to the propeller 700 is interlocked to rotate together.

When the central shaft 611 of the brush scraper 610 rotates, the brush 613 connected to the central shaft 611 rotates together to scrape the foreign substances accumulated on the inner circumferential surface of the filter mesh 620 to separate the foreign substance from the filter mesh 620, and then, the foreign substances separated from the filter mesh 620 are directed to the bottom surface of the main body 100 and are collected in the foreign substance collection chamber 130 by the collection scraper 630.

If an amount of fluid discharged through the 3-way discharge valve 410 is small, or a flow rate of the discharged fluid is low, and thus, the propeller 700 does not rotate properly, the brush 613 may not remove the foreign substances from the filter mesh 620. In this case, the manager manually rotates the handle 500 to rotate the central shaft 611 of the brush scraper 610 and the brush 613 connected thereto, thereby removing the foreign substances from the filter mesh 620.

After the foreign substances are collected in the foreign substance collection chamber 130, when the manager switches the setting of the 3-way discharge valve 410 from the cleaning mode to the discharge mode to open the 3-way discharge valve 410, the discharge of the fluid from the lower cover 220 is stopped, and the fluid contained in the main body 100 is discharged through the 3-way discharge valve 410 connected to one surface of the foreign substance collection chamber 130. In this process, the foreign substances collected in the foreign substance collection chamber 130 are discharged to the outside of the strainer through the 3-way discharge valve 410 together with the fluid, and thus, the process of cleaning the inside of the non-powered strainer is completed.

Until now, preferred embodiments of the present invention have been described mainly. It will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

The invention claimed is:
1. A strainer comprising:
a cylindrical main body provided with a foreign substance collection chamber configured to collect foreign substance at one side of a lower portion thereof;
an inlet pipe installed in one surface of the main body;
an outlet pipe installed in the other surface of the main body to face the inlet pipe;
a cylindrical filter mesh accommodated inside the main body to filter foreign substances contained in a fluid introduced into the main body through the inlet pipe;
a lower cover coupled to a lower portion of the main body;
a propeller accommodated inside the lower cover;
a brush scraper comprising a central shaft which passes through a center of the filter mesh and of which a lower end is coupled to a center of the propeller and a brush connected to the central shaft to rotate together when the central shaft rotates to scrape off the filter mesh so as to remove the foreign substances accumulated on an inner circumferential surface of the filter mesh;

a drain pipe configured to connect a side of the main body to the lower cover so that the fluid flows from the lower portion of the main body to the inside of the lower cover; and a 3-way discharge valve having one end connected to the lower cover and the other end connected to the foreign substance collection chamber and configured to discharge the fluid contained in the main body to the outside or discharge the fluid contained in the lower cover to the outside according to a discharge mode.

2. The strainer of claim 1, wherein, when the 3-way discharge valve is opened in a cleaning mode, the fluid contained in the main body is introduced into the lower cover through the drain pipe, and the fluid introduced into the lower cover is discharged through the 3-way discharge valve to rotate the propeller, thereby rotating the central shaft.

3. The strainer of claim 1, wherein, when the 3-way discharge valve is opened in a discharge mode, the fluid contained in the main body is discharged through the 3-way valve connected to the foreign substance collection chamber.

4. The strainer of claim 1, further comprising a collection scraper coupled to a lower portion of the central shaft to rotate together when the central shaft rotates so that the foreign substances on a bottom surface of the main body are collected into the foreign substance collection chamber.

5. The strainer of claim 1, further comprising:
an upper cover coupled to an opened upper portion of the main body; and
a handle,
wherein an upper end of the central shaft is coupled to a center of the handle by passing through a center of the upper cover, and when the handle rotates, the central shaft rotates by being interlocked with the handle.

6. The strainer of claim 1, further comprising:
a first pressure gauge installed in the inlet pipe; and
a second pressure gauge installed in the outlet pipe.

7. The strainer of claim 1, wherein the brush is connected to the central shaft while rotating in a certain direction as it goes downward from an upper portion of the central shaft.

8. The strainer of claim 1, wherein a speed controller configured to adjust an amount of fluid flowing through the drain pipe to control a rotation speed of the propeller is further provided between the drain pipe and the lower cover.

9. The strainer of claim 1, wherein each of the inlet pipe and the outlet pipe is connected to the pipe by a groove joint.

* * * * *